United States Patent Office

3,275,588
Patented Sept. 27, 1966

3,275,588
ETHYLENIMINE-POLYALKYLENEPOLYAMINE-POLYEPIHALOHYDRIN TERPOLYMER FLOCCULANTS
David C. Garms, Lake Jackson, Tex., assignor to The Dow Chemical Company, Midland, Mich., a corporation of Delaware
No Drawing. Filed June 16, 1965, Ser. No. 464,560
4 Claims. (Cl. 260—29.2)

This is a continuation-in-part of application Serial No. 235,547, filed November 5, 1962, now abandoned.

This invention relates to novel terpolymer compositions. More specifically, the invention concerns ethylenimine-polyalkylenepolyamine - polyepihalohydrin terpolymers having valuable utility as flocculants. The term "terpolymer" is utilized to mean the product of the polymerization of three different polymerizing substances.

The terpolymers of the present invention are prepared by the reaction of ethylenimine, a polyalkylenepolyamine and a polyepihalohydrin in an aqueous solution maintained at a temperature of from about 50° to 125° C.

The polyalkylenepolyamine employed to prepare the terpolymer of the present invention may be represented by the general formula:

$$H_2N—(C_nH_{2n}NH)_a—H$$

where $n$ is 2, 3 or 4 and $a$ may range in value from about 6 to about 28, depending upon the value of $n$, i.e. $a$ has a value sufficient to represent a polymer having a molecular weight of from about 400 to 1200. A suitable method for preparation of such a polyalkylenepolyamine is the step-wise condensation of a low molecular weight polyamine and a dihaloalkane, e.g. triethylenetetramine and dichloroethane. The following method is a representative procedure for preparing a suitable polyalkylenepolyamine having a molecular weight of about 400. This product was employed in the later-following examples of terpolymer preparation.

METHOD A

Streams of (1) a 50 weight percent aqueous solution of triethylenetetramine, at a rate of 1.3 gal./min. and (2) ethylene dichloride, at a rate of 0.37 gal./min. were fed to a mixing nozzle and the resulting mixture was fed as a 1.67 gal./min. stream into a continuous coil reactor with a holdup time of 20 min. The exit stream of 1.67 gal./min. and an ethylene dichloride stream of 0.37 gal./min. were fed to a second mixing nozzle and the resulting stream, 2.04 gal./min., was channeled to a soaking tank with a holdup time of approximately 31 min. The exit stream of 2.04 gal./min. was passed into a flash tank where a portion of the water and unreacted ethylene dichloride (less than about 0.5 gal./min.) were flashed off. A 1.5 gal./min. exit stream of the remaining contents and a 50 weight percent aqueous sodium hydroxide stream flowing at a rate of 5 to 6 gal./min. were confluently directed into a mixing pump and the ensuing 6.5 to 7.5 gal./min. mixture was fed to a phase separator maintained at a temperature of about 130° to 150° C. Spent caustic solution, containing sodium chloride, was removed from the bottom and the desired product was removed from the top of the phase separator as an approximately 94 weight percent polyethylenepolyamine aqueous solution. The temperature of the coil reactor was maintained at about 150° to 170° C. and the temperature of the soak tank was maintained at about 150° to 200° C. The polyethylenepolyamine product so-made had a molecular weight of about 400.

The polyepihalohydrin, either polyepichlorohydrin or polyepibromohydrin, employed in the formation of the terpolymer of the present invention has a molecular weight of from about 250 to 1000. Polyepichlorohydrin and polyepibromohydrin are well known materials produced by the polymerization of the corresponding epihalohydrin. Although such polymerization is generally initiated by use of water, glycerol chlorohydrin, or other polyfunctional compounds, such as propylene glycol which is employed in the representative method (Method B) below, such initiators ordinarily constitute a minor part of the polymer chain and their identity has no significant influence on the properties of the resulting polymer in relation to its use in the terpolymer composition of the present invention. Thus, the polyepihalohydrin employed in the method of this invention may be represented by the formula

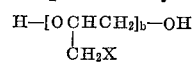

wherein X is chlorine or bromine and $b$ may be an integer from about 2 to 10, with the understanding that the polyepihalohydrin chain may contain, as a starter, a difunctional radical derived from a dihydroxy compound other than glycerol chlorohydrin. Method B, below, was employed to prepare the polyepihalohydrin employed in the later-following examples of terpolymer preparation.

METHOD B

A reaction vessel equipped with a stirrer, condenser and temperature control means was charged with 4.05 moles of epichlorohydrin and 1 mole of propylene glycol. A quantity of 0.03 weight percent of boron trifluoride etherate (based on the weight of propylene glycol) was added to the flask and the temperature maintained at from about 55° to 60° C. After completion of the reaction, as determined by a maximum value in the molecular weight of samples of the flask contents, the reaction mixture was neutralized with aqueous sodium hydroxide. The polyepichlorohydrin had a molecular weight of approximately 450. Polyepibromohydrin may be similarly prepared by substitution of epibromohydrin for epichlorohydrin in the above method.

In the general method of the present invention, whereby novel terpolymers having excellent flocculating activity are prepared, a quantity of from about 20 to 40 parts by weight of ethylenimine is slowly added, with stirring, to a flask containing (1) from about 8 to 13 parts by weight of polyalkylenepolyamine, having a molecular weight of from about 400 to 1200, (2) from 2.5 to about 3.5 parts by weight of a polyepihalohydrin, having a molecular weight of from about 250 to 1000, and (3) from about 45 to 70 parts by weight of water. The weight ratio of ethylenimine to polyalkylenepolyamine is preferably within the range of from about 2:1 to 3:1, respectively. The temperature of the flask is maintained at from about 50° to 125° C. with a preferred range being 70° to 90° C.

The following examples describe completely representative specific embodiments of the present invention. The examples, however, are not to be interpreted as limiting the invention other than as defined in the claims.

*Example 1*

A quantity of 60.2 grams of polyethylenepolyamine and 22.9 grams of polyepichlorohydrin (which were prepared as previously described) and 481.6 grams of water were placed in a flask equipped with a stirrer, condenser and temperature control means. The temperature of the flask contents was raised to 80° C. and maintained thereat while a quantity of 180.6 grams of ethylenimine was added, dropwise, over a 30 minute period of time. The weight percentages of the components were: 24.2% ethylenimine, 8.1% polyethylenepolyamine, 3.1% polyepichlorohydrin and 64.6% water. Upon completion of the ethylenimine addition, the reaction mixture was digested for approximately 9 hours at 80° C. An aqueous solution containing 1 percent by weight of the resulting terpolymer product had a viscosity of 1.66 centistokes as measured at 100° F. using a modified Ostwald viscometer. The flocculation rate of this terpolymer, measured as described in the following paragraph, was 6.70 inches per minute.

The test procedure for determining the flocculating activity of the terpolymer compositions of the present invention was as follows. An aqueous solution containing one weight percent of terpolymer solids was prepared. Five milliliters of this 1% solution was added to 95 milliliters of water and the components were thoroughly mixed. A quantity of 0.7 milliliter of this stock solution was added in three equal increments to an aqueous solution containing 5 weight percent of arrowroot starch which had been previously prepared, with mixing, and allowed to sit for 30 minutes before the flocculant addition.

*Example 2*

A quantity of 42.3 grams of polyethylenepolyamine, 10.15 grams of polyepichlorohydrin, 169.2 grams of water and 126.9 grams of ethylenimine were employed in accordance with the procedure of Example 1. An aqueous solution containing 1 weight percent of the terpolymer product had a viscosity of 2.30 centistokes and the flocculation rate of the terpolymer was 6.8 inches per minute. The methods of viscosity measurement and determination of flocculation rate as well as the description of reactants are detailed in Example 1. The weight percentages of the components were: 36.4% ethylenimine, 12.1% polyethylenepolyamine, 2.9% polyepichlorohydrin and 48.6% water. Substitution of polyepibromohydrin for polyepichlorohydrin in the above experiment will yield a similar terpolymer product. The polyethylenepolyamine component in the above example may be replaced by polypropylenepolyamine having a molecular weight of from about 400 to 1200 to yield a similar terpolymer product.

Other experiments, conducted in accordance with the method of Example 1 and utilizing the materials employed therein, established the necessity of employing a minimum of 2.5 weight percent of polyepihalohydrin in order to obtain a terpolymer having flocculating acivity. These additional experiments similarly established the necessity of employing an ethylenimine:polyalkylenepolyamine weight ratio of greater than 1:1, in order to obtain the terpolymer product of the present invention.

I claim:

1. A resinous terpolymer which comprises the reaction product of:
    (1) from about 20 to 40 parts by weight of ethylenimine,
    (2) from about 8 to 13 parts by weight of a water-soluble polyalkylenepolyamine having a molecular weight from about 400 to 1200 and the general formula $$H_2N-(C_nH_{2n}NH)_a-H$$

wherein $n$ is 2, 3, or 4, and $a$ is an integer of from about 6 to about 28, and
    (3) from about 2.5 to 3.5 parts by weight of a water-soluble polyepihalohydrin, having the formula $$H-[OCHCH_2]_b-OH$$
    $$\phantom{H-[O}CH_2X$$

wherein X is chlorine or bromine and $b$ is an integer from about 2 to 10, said polyepihalohydrin, having a molecular weight of from about 250 to 1000,
    in from about 45 to 70 parts by weight of water and at a temperature of from about 50° to 125° C.

2. The terpolymer of claim 1 wherein the polyalkylenepolyamine is polyethylenepolyamine and the polyepihalohydrin is polyepichlorohydrin.

3. A method of preparing a novel terpolymer of ethylenimine, polyalkylenepolyamine and polyepihalohydrin which comprises the steps of slowly adding from about 20 to 40 parts by weight of ethylenimine to an aqueous solution composed of:
    (1) from about 8 to 13 parts by weight of a water-soluble polyalkylenepolyamine having a molecular weight of from about 400 to 1200 and the general formula $$H_2N-(C_nH_{2n}NH)_a-H$$

wherein $n$ is 2, 3, or 4 and $a$ is an integer of from about 6 to about 28,
    (2) from about 2.5 to 3.5 parts by weight of a water-soluble polyepihalohydrin, having the formula $$H-[OCHCH_2]_b-OH$$
    $$\phantom{H-[O}CH_2X$$

wherein X is chlorine or bromine and $b$ is an integer from about 2 to 10, said polyepihalohydrin having a molecular weight of from about 250 to 1000, and
    (3) from about 45 to 70 parts by weight of water,
said aqueous solution being maintained at a temperature of from about 50° to 125° C. during said addition of ethylenimine and for a period of time thereafter sufficient to complete formation of the terpolymer product.

4. The method of claim 3 wherein the polyalkylenepolyamine is polyethylenepolyamine and the polyepihalohydrin is polyepichlorohydrin.

References Cited by the Examiner

UNITED STATES PATENTS

| | | | |
|---|---|---|---|
| 2,272,489 | 2/1942 | Ulrich | 260—2 |
| 2,318,729 | 5/1943 | Wilson | 260—583 |
| 2,469,683 | 5/1949 | Dudley et al. | 260—2 |
| 2,601,597 | 6/1952 | Daniel et al. | 260—2 |
| 2,891,073 | 6/1959 | Smith | 260—2 |
| 2,909,448 | 10/1959 | Schroeder | 260—2 |
| 3,021,232 | 2/1962 | Pretka | 260—47 |
| 3,058,921 | 10/1962 | Pannell | 260—2 |

SAMUEL H. BLECH, *Primary Examiner.*

MURRAY TILLMAN, *Examiner.*

J. C. BLEUTGE, *Assistant Examiner.*